United States Patent [19]
Brooker et al.

[11] Patent Number: 6,141,131
[45] Date of Patent: Oct. 31, 2000

[54] METHODS AND APPARATUSES FOR HIGH-SPEED CONTROL OF LAMP INTENSITIES AND/OR WAVELENGTHS AND FOR HIGH-SPEED OPTICAL DATA TRANSMISSION

[75] Inventors: Gary Brooker, Potomac; J. Scott McDonald, Germantown, both of Md.; Jeffrey Scott Brooker, Herndon, Va.

[73] Assignee: Atto Instruments, Inc., Rockville, Md.

[21] Appl. No.: 08/957,458

[22] Filed: Oct. 24, 1997

Related U.S. Application Data

[63] Continuation of application No. 08/339,218, Nov. 10, 1994, Pat. No. 5,723,943.

[51] Int. Cl.[7] .................................................. H04B 10/04
[52] U.S. Cl. .......................................... 359/180; 359/132
[58] Field of Search .................................. 359/123, 132, 359/180

[56] References Cited

U.S. PATENT DOCUMENTS

| | | | |
|---|---|---|---|
| 4,467,468 | 8/1984 | Miller | 70/3 |
| 4,801,840 | 1/1989 | Dobrusskin et al. | 313/44 |
| 5,307,194 | 4/1994 | Hatton et al. | 359/154 |
| 5,610,911 | 3/1997 | Ishikawa et al. | 359/135 |

*Primary Examiner*—Leslie Pascal
*Attorney, Agent, or Firm*—Oblon, Spivak, McClelland, Maier & Neustadt, P.C.

[57] ABSTRACT

Methods and apparatuses for high-speed control of lamp intensity and for high-speed optical data communication are disclosed. In particular embodiments, an arc, plasma or halogen lamp is provided with the ability to change wavelengths and/or intensities at high rates (up to 10 gigahertz) by maintaining materials which may be solid or liquid under typical lamp operation or storage conditions in the vapor state. This method and apparatus is particularly applicable to microscopy and high-speed optical data communication, particularly at wavelengths in the visible and ultraviolet spectra.

6 Claims, 3 Drawing Sheets

6,141,131

METHODS AND APPARATUSES FOR HIGH-SPEED CONTROL OF LAMP INTENSITIES AND/OR WAVELENGTHS AND FOR HIGH-SPEED OPTICAL DATA TRANSMISSION

This is a Continuation, of application Ser. No. 08/339,218 filed on Nov. 10, 1994 now U.S. Pat. No. 5,723,943.

BACKGROUND OF THE INVENTION

1. Field of the Invention

The present invention concerns methods and apparatuses for high-speed control and/or switching of lamp intensities and/or wavelengths and for high-speed optical data communication.

2. Discussion of the Background

Light sources or lamps containing materials which, in the vapor state, are responsible directly or indirectly for illumination but which are at least partially solid or liquid under typical conditions of storage and/or use of the lamp (e.g., a temperature of from 15° C. to 350° C. or more, a pressure from a near vacuum [e.g., 0.01 atm] to several atm or more) are well-known, and are used frequently in particular fields of technology. Such lamps include vapor arc lamps (e.g., mercury arc lamps), plasma arc lamps and halogen lamps (e.g., containing a tungsten filament and iodine crystals), and may include other light sources such as sodium lamps.

For example, vapor arc lamps are typically used in photochemistry (see *Kirk-Othmer Encyclopedia of Chemical Technology*, 3rd ed. (1982), vol. 17, pages 545–553). Mercury vapor arc lamps of the high-pressure type produce an output of 1–10,000 W of power, and are useful for ultraviolet curing, photochemical reactions, etc. Mercury vapor arc lamps of the low-pressure type produce an output of 1–400 W of power, and are useful for photosterilization, photochemical reactions, etc. Mercury vapor arc lamps of the capillary type produce an output of 1.5–5 kW of power, and are useful for ultraviolet polymerization, projection, photochemical reactions and biological research.

The so-called "halogen" lamps contain as an active illumination material a metal or alloy filament (e.g., of Group VIb metals [Cr, Mo, W]), and as an auxiliary material, a halogen (e.g., $Cl_2$, $Br_2$, $I_2$). Halogen lamps provide significant advantages in longevity and in light output over non-halogen-containing filament bulbs. In a halogen lamp, metal atoms which escape from the filament as vapor react with the halogen molecules, thus preventing metal deposits from forming on the inner surface of the bulb. As the formed metal halide returns near the filament, the heat from the active filament provides the energy for separating metal from halide, thus recycling the metal back to the filament.

Metal halide lamps also exist as so-called "short arc" lamps. Short arc metal halide lamps have high luminance and high efficacy, thus providing particular advantages as projection light sources (e.g., in slide projectors and in overhead projectors). Halogen lamps are also useful in photocopiers and as high-power illumination sources (e.g., stadium lamps, spotlights).

Such lamps rely on materials which must be in the vapor state to achieve the desired results and/or advantages. However, many such materials are also at some point at least partly in the solid or liquid state prior to or during use. Prior to the present invention, however, one merely had to wait until the lamp heated up to a temperature which resulted in complete vaporization of the partially solid or liquid materials in order to take full advantage of the technology. As a result, many high-speed applications using such lamps have been unattainable.

Fiber optic communication apparatuses and methods are well-known, and are useful for transmitting data over both long distances (e.g., telecommunications, cable television service, communications equipment for remote-site journalism and for military applications, etc.) and short distances (e.g., local-area computer networks and signal transmission in environments subject to severe electromagnetic interference; for reviews on fiber optics and fiber optic communications, see *Kirk-Othmer Encyclopedia of Chemical Technology*, 4th ed. (1993), vol. 10, pages 514–538 and references cited therein, and J. Hecht, "Understanding Fiber Optics," Howard W. Sams and Co., Indianapolis, Indiana (1987)). However, light sources for generating the transmitted light signals are typically limited to lasers or light-emitting diodes (LEDs), which are limited in (i) the power with which the signals can be sent and (ii) the wavelengths of light which can be generated.

SUMMARY OF THE INVENTION

Accordingly, one object of the present invention is to provide a novel lamp in which materials contained therein which are at least particularly solid or liquid under typical conditions of use and/or storage are vaporized prior to generating light with the lamp.

A further object of the present invention is to provide a novel method for reducing the rise time (i.e., the length of time necessary for full lamp output in response to a particular applied power) of a lamp containing materials which are at least partially solid or liquid under conditions of lamp storage and/or use.

A further object of the present invention is to provide a novel method and apparatus for switching between two or more intensities and/or wavelengths of light at high speeds (e.g., from 1 Hz to 10 GHz).

A further object of the present invention is to provide a novel method and apparatus for high-speed, multiplewavelength, high-intensity optical data communication.

These and other objects of the invention, which will be readily and more completely understood in the context of the following description of the preferred embodiments, have been accomplished by an apparatus for generating light, comprising:

(A) a lamp containing one or more materials (i) which are at least partially solid or liquid under conditions of lamp use and/or storage and (ii) which do not generate light below a threshold electric power but which, in response to an applied electric power greater than the threshold electric power, generate light of an intensity related to the difference between the applied electric power and the threshold electric power, and (B) an external power source for applying power to the lamp sufficient to vaporize the material which is at least partially solid or liquid under conditions of lamp use and/or storage when the applied electric power is below the threshold electric power;

a method of decreasing the rise time of a lamp containing one or more materials (i) which are at least partially solid or liquid under conditions of lamp use or storage and (ii) which do not generate light below a threshold electric power but which, in response to an applied electric power greater than the threshold electric power, generate light of an intensity related to the difference between the applied electric power and the threshold electric power, comprising the steps of:

(A) applying a first power to an external power source in thermal, physical or optical contact with the lamp, the first power being sufficient to vaporize the material which is at least partially solid or liquid under conditions of lamp use or storage, and (B) applying a second power to the lamp sufficient to generate light; and a method of optical data communication, comprising the steps of:

(a) transmitting light having a first wavelength, a first intensity or both a first wavelength and a first intensity from a vapor arc, plasma or halogen lamp along an optical fiber to a receiver in optical communication with said optical fiber; and (b) within a period of time of from 0.1 nanosecond to 1 second of transmitting step (A), transmitting light having a second wavelength, a second intensity or both a second wavelength and a second intensity from the lamp along the optical fiber to the receiver.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
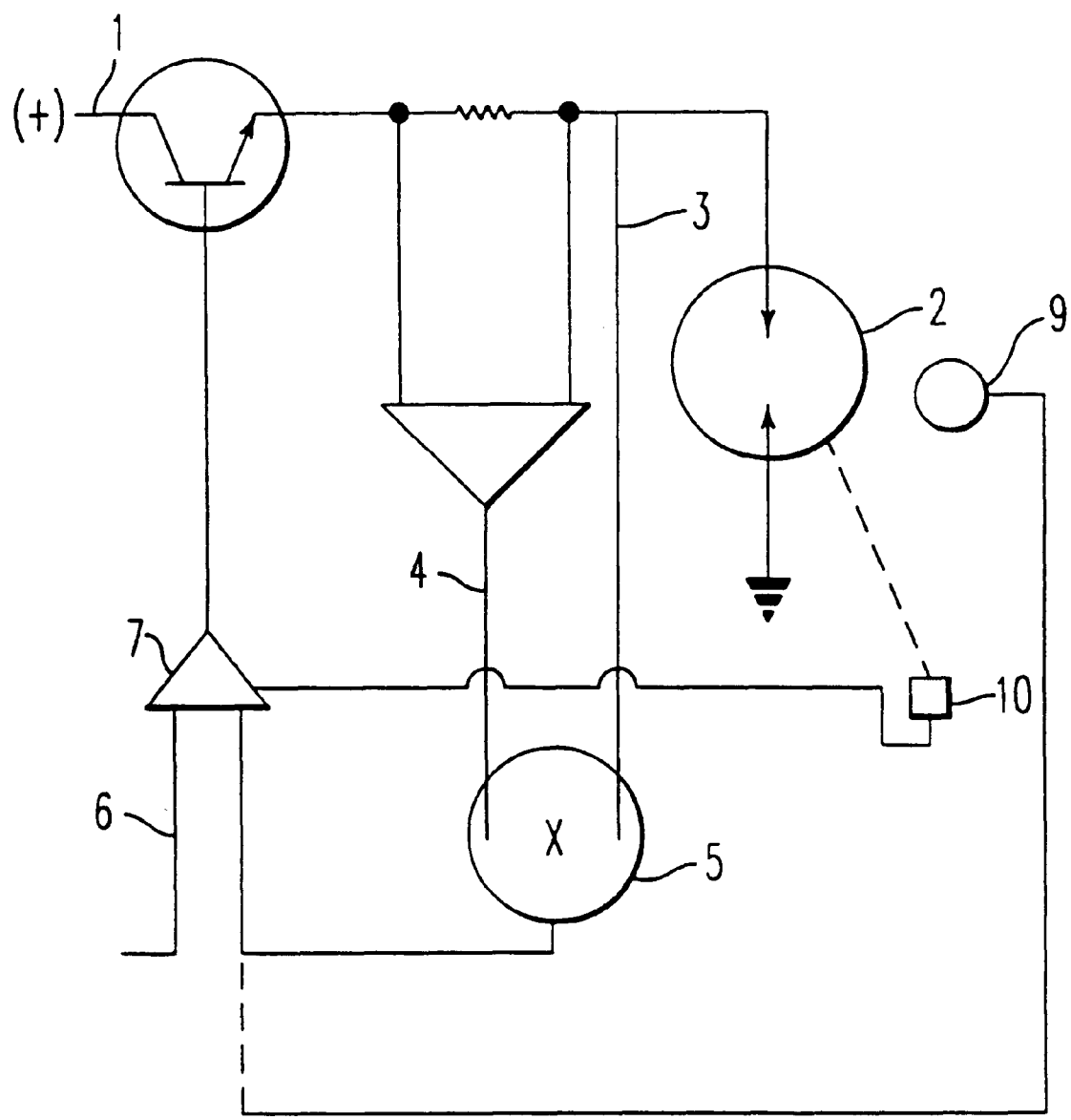
FIG. 1 is a schematic of one embodiment of the present apparatus for generating light.

Referring now to the drawings, wherein like reference numerals designate identical or corresponding parts throughout the several views, and more particularly to FIG. 1 thereof, which shows an embodiment of the present apparatus for generating light, electric power is provided from power source 1 to lamp 2, which is in electrical connection with voltage sense line 3 and current sense line 4. An analog multiplier 5 multiplies the voltage from voltage sense line 3 by the current from current sense line 4. The electrical power output from the multiplier 5 is compared to a reference voltage in reference voltage line 6 using comparator 7.

In the context of the present invention, a "comparator" is any device, such as a computer, which is able to (i) compare the electrical signals from multiplier 5 and reference voltage line 6, and (ii) send a signal to either of power source 1 or external power source 10 to adjust the total power to lamp 2 to match that of the predetermined reference voltage. The reference voltage 6 is set at that voltage necessary to provide the power which results in a desired light output from lamp 2. Reference voltage 6 is predetermined by establishing the relationship between power applied directly to the lamp and light output from the lamp (e.g., as described below), dividing by the known amount of current passing through the circuit, then chossing the voltage necessary to provide the desired power which results in the desired light output.

Temperature and Power Considerations for Control of Lamp Intensity

The present Inventors have discovered that operational rapid switching of the lamp from full power to minimal power is markedly enhanced if one keeps the temperature of a lamp above the temperature necessary to essentially completely vaporize the materials (e.g., mercury) in the lamp (a) which are required for generating light and/or increasing intensity or lamp lifetime, and (b) which may be solid or liquid at temperatures and/or pressures of lamp use and/or storage. This can be accomplished by, for example, heating the arc lamp envelope when the arc is at low power so that no time or energy is needed to vaporize solid or liquid materials (e.g., mercury) upon re-application of full applied power, thus applying all applied power to the arc plasma, which comes up to full light output intensity within the limits of the controlling circuitry.

To provide stable light output from lamp 2, the circuit shown schematically in FIG. 1 provides an electronic feedback loop which increases power to an external power source 10 (e.g., a heater in contact with the arc lamp) as the power directly applied to the arc from power source 1 decreases to about or below a threshold power. As the applied power increases above the threshold power, the feedback loop decreases power to the external power source 10. (The "threshold power" is that amount of energy per unit time necessary to completely or essentially completely vaporize all solid or liquid materials which must be in the vapor state to maximize the responsiveness of the lamp in generating light, and/or provide any other advantages of the materials). Thus, the feedback loop in FIG. 1 provides stable light output from the lamp 2, regardless of the power applied to the lamp by power source 1.

Thus, an essential concept in the present invention is to ensure application, either directly or indirectly, of at least that threshold power necessary to vaporize materials (a) which may be at least partially solid or liquid under conditions of lamp storage or usage and (b) which may be necessary to either generate light or increase the longevity and/or intensity of other light-generating materials in the lamp. If the power applied to the lamp for generating light falls below the threshold power necessary to vaporize such materials, an external power source provides sufficient power to the lamp to vaporize those solid and/or liquid materials which must be vaporized to achieve maximum results. The feedback loop shown in FIG. 1 provides the appropriate controls to ensure application of at least a threshold power to the lamp either through directly applied power (i.e., that used in generating light) or through externally applied power (e.g., a heater in physical, optical or thermal contact with the lamp).

Comparator 7 may comprise a computer having appropriate communication capabilities with reference voltage line 6, applied power source 1, external power source 10, and the signal from multiplier 5.

Multiplier 5 may be either analog or digital. An analog multiplier is preferred, since the number of computations (i.e., data conversions) are minimized, thus increasing the maximum theoretical rate at which power signals to the lamp can be changed. However, digital multipliers will also be suitable for use in the present apparatus and method, particularly if comparator 7 comprises a digital computer, even though the additional steps of converting the analog signals from voltage sense line 3 and current sense line 4 to digital data (at a predetermined rate) and reconverting the digital data with the computer to analog data via a digital-to-analog converter must also be conducted.

Alternatively, a photodiode 9 shown in FIG. 1 detects light output and transmits a proportional electric signal to comparator 7. (The dashed line in FIG. 1 between photodiode 9 and comparator 7 refers to the alternative nature of this embodiment, in that a connection may or may not exist.) In accordance with the method described above, a sufficient amount of power is then supplied to lamp 2 either by applied power source 1 or external power source 10 to vaporize solid or liquid materials which must be vaporized to provide maximum results, and thus, provide a constant output of light intensity. (The dashed line in FIG. 1 between lamp 2 and external power source 10 refers to the alternative connections, direct or indirect, which may or may not be employed.)

Lamps useful in the present invention include those in which light output from the lamp is dependent at least in part on vaporized materials which are at least partially in the solid or liquid state under conditions which the lamp may be subject to during use and/or storage (e.g., at temperatures of from 15 to 350° C. or more, pressures of from 0.01 to 10 or more atmospheres, etc.). In the present apparatus, the lamp may be a conventional vapor arc lamp, a conventional plasma lamp, or a conventional halogen lamp (e.g., a tungsten/iodine lamp). The lamp in the present apparatus may also include a sodium lamp. Mercury arc lamps and halogen lamps (particularly tungsten/iodine lamps) are preferred. (To simplify the discussion of the present invention, lamp-related aspects may be illustrated with regard to a mercury vapor arc lamp.)

In the present invention, the external power source is a source of energy applied externally to the lamp over time, and may comprise one or more members selected from the group consisting of:

(a) a substance in thermal contact with the lamp, the substance being heated sufficiently to vaporize the material which is at least partially solid or liquid under conditions of lamp use or storage;

(b) microwave or radio frequency irradiation;

(c) an electrically resistant material, located within the lamp;

(d) light irradiation in optical communication with the lamp; and (e) a seal or insulator at least partly surrounding the lamp.

The external power source may be powered by either alternating current (ac) or direct current (dc).

Where the external power source is a substance in thermal contact with the lamp, the substance may comprise a gas heated sufficiently to vaporize the material which is at least partially solid or liquid under conditions of lamp use or storage, passed over the lamp during period(s) of time where the applied power is about or below the threshold power. (The phrase "thermal contact" may refer to physical, electronic or optical contact or communication between, for example, the external power source and the lamp.)

In an alternative embodiment, the substance may be a high-temperature liquid (preferably non-flammable) which flows through a jacket at least partially (but preferably at least 80%) surrounding the bulb. More preferably, such liquid does not absorb a significant amount of light (e.g., 10% or less) at a desired wavelength or band of wavelengths of light transmission.

The substance may also be a resistance heater (e.g., an electrically resistant metal or alloy) in direct or indirect physical contact with the lamp. "Indirect" physical contact refers to the situation where heat generated by the resistance heater is transferred to the lamp through a heat transfer medium, such as glass, quartz or even air (where the heater is loosely enclosed in a jacket or envelope). A resistance heater is the preferred apparatus for externally heating the lamp.

Where the external power source comprises an electrically resistant material located within the lamp, the electrically resistant material may be a pilot arc, such as that described in U.S. application Ser. No. 08/217,883, filed Mar. 25, 1994. A so-called "multiple arc" lamp may be used, with a pilot arc positioned out of the optical axis and a running arc positioned in the optical axis of the lamp. An applied power to the pilot arc creates and maintains sufficient thermal energy in the lamp to vaporize the material(s) which are at least partially solid or liquid under the conditions of lamp use or storage, and maintain these materials in the vapor state. The running arc can be switched on or off, or have its intensity adjusted by varying the power applied to it.

Where the external power source is light irradiation, the light irradiation may be provided by a second lamp in optical communication with the first lamp of the apparatus. In the present application, the phrase "in optical communication" refers to the ability of a light source to irradiate a desired object (e.g., the light from the second lamp irradiating the first lamp).

Another method which can be used alone or in combination with the heating method involves a closed loop feedback control of light intensity (see, for example, FIG. 1). In this configuration an optical sensor (photodiode 9) monitors the light output from each lamp and regulates the power to the lamp to achieve the desired light output.

In the absence of heating the arc lamp envelope, when the lamp is switched from high power to low power or low light intensity, the power to the lamp increases as the mercury begins to condense, keeping it appropriately vaporized. Upon switching to high light intensity, the feedback sensor recognizes that more power is needed to reach the steady state high light output, and thus, more power is pumped into the lamp until all of the mercury is vaporized, at which time the power to the lamp reaches its normal steady state full power.

For example, if a 100 W mercury vapor lamp is operating, once the lamp has warmed up and 100 W of power is supplied to the lamp, it might output 1000 foot-candles of light. If we drop the power supplied to the lamp to 3 W, the light output should immediately drop to 30 foot-candles of light. However, 3 W of energy input to the lamp does not provide sufficient energy to maintain light output at 30 foot-candles (3% ×1000). Thus, the light output diminishes over time until the arc is extinguished.

The reason the arc extinguishes is that insufficient power is being provided to maintain the mercury in a vaporized state. Thus, the light output can be maintained at 30 foot-candles by applying energy to the lamp envelope in the form of a resistance heater, by modifying the arc lamp to include a heater coil inside, by increasing the power to the arc as the light intensity drops, or by one or more additional methods or devices as described above.

Thus, the following equation describes the factors which control light output from an arc source:

Light output=(arc power)+(power required to maintain mercury in vaporized state)

Figure 2:
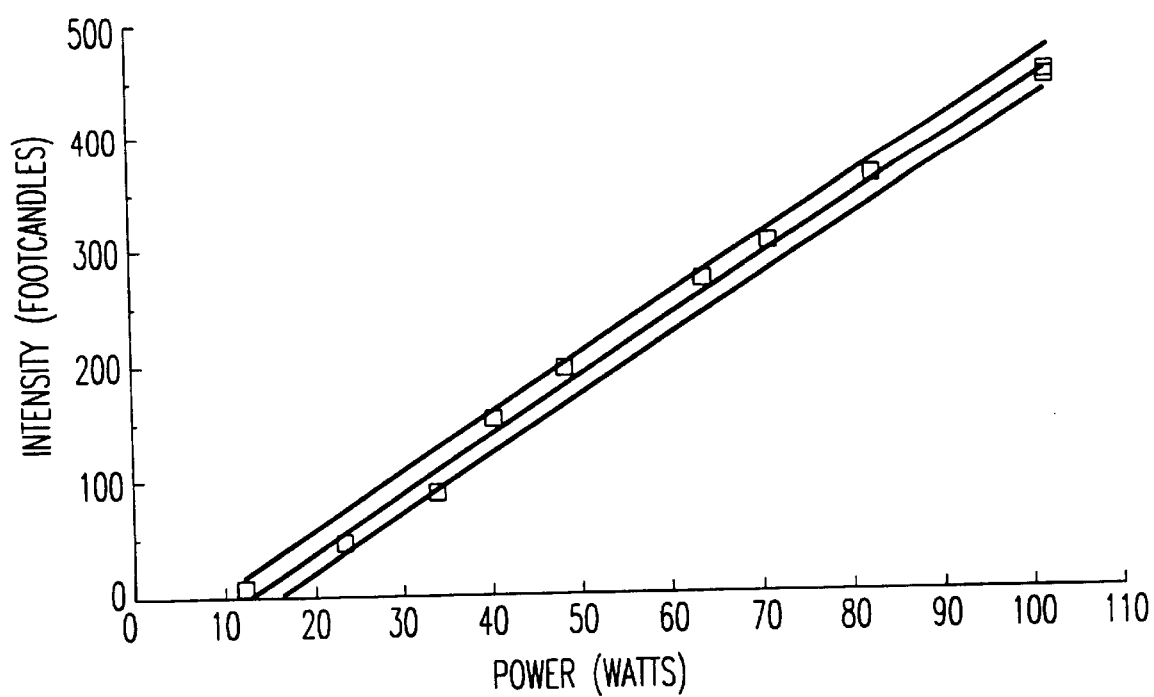
FIG. 2 is a graph showing the relationship between power applied to a conventional mercury arc lamp and light output from the lamp.

We have found that there is a linear relationship between arc intensity and power above that point wherein all of the mercury is vaporized, as shown in the graph in FIG. 2. In this experiment, the power to the arc was varied and the light output measured. The arc extinguished at about 10% of the maximum power rating of the lamp.

For example, mercury vapor lamps provide a light output linearly proportional to power input above a threshold applied power. The threshold applied power is that amount of power necessary to keep the mercury completely vaporized. For a conventional mercury arc lamp, this temperature may be about 350° C., although the actual temperature may vary with the specific lamp used. This temperature can be determined empirically in accordance with the procedures described below.

Figure 3:
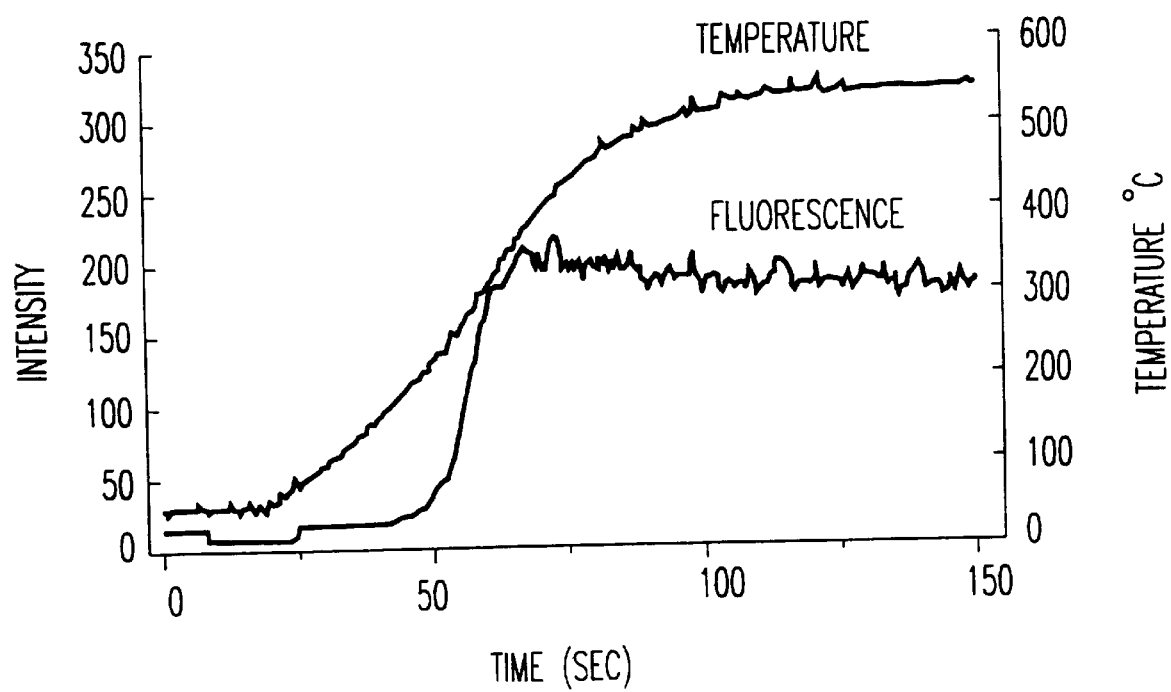
FIG. 3 is a graph showing bulb temperature and fluorescence intensity of a dye excited by irradiation from the lamp, each as functions of time.

In another series of experiments, the present Inventors have discovered that once the temperature of the arc lamp (measured with a thermocouple on the surface of the lamp) exceeded the temperature necessary to vaporize all the mercury droplets in the lamp, the light output remained constant when full power was applied to the lamp. In the experiment which produced the data shown in the graph of FIG. 3, the fluorescence of the dye fura-2, excited at 380 nm from an arc lamp warming up, was monitored (fluorescence being directly proportional to light output from the arc). Notice that the fluorescence intensity remained relatively constant once the bulb reached 350 degrees C., even though the temperature continued to climb to about 540 degrees at equilibrium.

Although the present invention is capable of generating or transmitting light having a wavelength of from 200 nm to 6,000 nm (consistent with the present state of technology), the present invention is particularly applicable to generation or transmission of light having a wavelength in the visible or ultraviolet spectrum (i.e., from 100 nm to 800 nm, preferably from 200 nm to 770 nm).

The present method of decreasing the rise time of a lamp may further comprise the steps of applying an electric power to the lamp sufficient to generate light prior to step (A) (see the "Summary of the Invention" section above), and reducing the power to below the threshold electric power, simultaneously with or after step (A), but prior to step (B).

Both the present apparatus and the present methods of transmitting light and decreasing the rise time of a lamp are particularly advantageous for high-speed control and switching between two or more wavelengths and/or intensities of light using one or more light sources (lamps). Thus, using a single lamp, one can irradiate a particular object from one to 10 billion times a second (preferably at a rate of from 10 Hz to 1 GHz, more preferably from 20 Hz to 1 GHz). As many different wavelengths and/or intensities as can be programmed into a computer control of the circuitry can be controlled. The present method and apparatus are also particularly applicable to the methods disclosed and claimed in copending application Ser. No. 08/217,883, filed Mar. 25, 1994, the entire contents of which are incorporated herein by reference, and to a method for multiple ratio imaging, disclosed and claimed in U.S. Pat. No. 5,332,905, also incorporated herein by reference.

The present method may be applied to multiple light sources as a means for independent control of each light source. The present apparatus for generating light may thus comprise multiple lamps which rely on materials which are at least partially solid or liquid under the conditions of use or storage of the lamp for light output, each lamp being equipped with an external power source for vaporizing such materials contained therein.

Consequently, the present invention also concerns a method of transmitting light, comprising the steps of:

(A) generating light having a first wavelength ($\lambda_1$), a first intensity ($I_1$) or both a first wavelength ($\lambda_1$) and a first intensity ($I_1$) with the present apparatus for generating light, and (B) generating light having a second wavelength ($\lambda_2$), a second intensity ($I_2$) or both a second wavelength ($\lambda_2$) and a second intensity ($I_2$) with the apparatus within a period of time of from 0.1 nanosecond (0.1 ns) to 1 second (1 s) of generating step (A), wherein at least one of the following relationships is true:

$$\lambda_2 \neq \lambda_1$$

$$I_2 \neq I_1$$

Preferably, when $\lambda_2 \neq \lambda_1$, $\lambda_1$ differs from $\lambda_1$ by at least 10 nm, and more preferably, by at least 20 nm. Similarly, when $I_2 \neq I_1$, $I_2$ preferably differs from $I_1$ by at least 10% (i.e., either $I_2 \geq (1.1 \times I_1)$ or $(1.1 \times I_2)$, more preferably by at least 50%, and most preferably, by a factor of two (100%; i.e., either $I_2 \geq (2 \times I_1)$ or $(2 \times I_2)$.

Use of Rapidly Switching Arc Lamps for Communication Purposes

The present method of optical data transmission represents a special embodiment of the present method of transmitting light, and may comprise the steps of (a) transmitting light having a first wavelength, a first intensity or both a first wavelength and a first intensity from a vapor arc, plasma or halogen lamp along an optical fiber to a receiver in optical communication with said optical fiber; and (b) within a period of time of from 0.1 nanosecond to 1 second of said transmitting step (A), transmitting light having a second wavelength, a second intensity or both a second wavelength and a second intensity from the lamp along the fiber to the receiver.

This method may be repeated a plurality of times at a rate of from 10 Gigahertz (10 GHz) to 1 hertz (1 Hz).

In the present method of optical data transmission, at least one of the wavelengths of light used may preferably be in the ultraviolet or visible spectrum (e.g., 100–800 nm, preferably 200–770 nm), and at least one of the intensities of light (where $I_2 \neq I_1$, the higher of the two intensities) may preferably be at least 10 Watts.

The present inventors have found that rapidly switching the arc lamp at very high speeds could be effectively used for data communication using fiber optic techniques. It is possible to modulate the light from a single or multiple light source in the gigahertz range. (Preferred ranges). Thus, (preferred embodiments), an arc source is an ideal light source to power certain fiber optic communication systems. It has considerable advantages over lasers, in that arc sources are orders of magnitude less expensive than lasers for the same amount of light output. In digital communication, electrically the "on" state is 2–5 v and the "off" state is 0–1.2 v. Thus for the arc to act as a communication transmitter over a fiber optic network, it only need be modulated between about 10%–40% of its maximum intensity, a feat which we can readily perform.

A further advantage of the lamps in the present invention (e.g., an arc source) are that they provide polychromatic light, whereas a laser is generally monochromatic. Thus, one can select distinct wavelengths of light with either a monochromater or with interference filters for generation/transmission. As a result, many (e.g., 1–1000) light sources can feed into a single fiber optic cable so that each wavelength of light acts as an independent communication channel. A single transatlantic cable may thus transmit 1000 different signals on the same fiber, each at a different wavelength of light. On the other end of the fiber optic cable, 1000 detectors each detect a specific wavelength of light to decode the information. Such detectors are quite common and are known in the trade as diode array detectors.

For example, if one wishes to transmit 5 independent signals over a fiber optic cable, 5 independent arc lamps, each under independent modulatory control, can be employed. The wavelengths at which the lamps transmit light signals may be somewhat arbitrarily selection (e.g., at 400 nm, 440 nm, 500 nm, 510 nm, and 700 nm). On the receiving end, 5 high speed photodiodes exclusively sensitive to 400, 440, 500, 510 and 700 nm light can be used to detect the 5 independent signals, thus converting the optical signals to electrical impulses. Consequently, the present invention dramatically increases the data handling capacity of existing fiber optic cables.

An additional advantage of the present invention is that it provides a ready source of modulatable light in the low visible and ultraviolet spectra. Light of such wavelengths is much more energetic than infrared light, which is typically used for optical data communication. Because the wavelength is shorter, the bandwidth of communication can be higher, and thus, more data can be included in the transmissions of a single fiber. There may also be increased distance of transmission at higher intensities, and thus, a reduced need for signal boosting/amplification in long-distance fiber optic transmission (e.g., 1 km or more).

However, losses due to absorption of higher-energy light by glass (the most common material for fibers) may be appreciable at lower wavelengths (e.g., less than 400 nm). Thus, quartz fibers, which are relatively more transparent to ultraviolet light, or plastic fibers, which are relatively more transparent to visible or infrared light, may be preferred for long-distance optical data transmission in accordance with the present invention over glass fibers.

The present invention also provides control of many wavelengths of light. As a result, many parallel communications can be coincident on the same cable. For example one may conduct independent communication at 200 nm, 210 nm, 250 nm, 300 nm, 305 nm, 350 nm, 388 nm, etc., up to about 800 nm (or greater, if one or more appropriate sources of infrared light are employed).

The limits to the switching/data transmission capabilities of the present methods appear to be limited to current means for detecting the light signals and for driving the light sources. The present methods and apparatuses for switching intensities and/or wavelengths of light follows input signals perfectly (i.e., less than detectable limits).

Consequently, the present invention is particularly applicable to optical computer circuits, where the present high-intensity, high-power optical signals are not affected by any strong local electromagnetic fields within the computer and which do not suffer from any long-distance transmission loss.

The present invention is also believed to be applicable to ultraviolet or broadband strobing (e.g., in microscopy, photolithography and semiconductor production). The present invention, particularly the apparatus for generating light and the method of decreasing the rise time of a lamp, is particularly applicable to methods and apparatuses used in microscopy, particularly those methods and apparatuses disclosed in U.S. application Ser. No. 08/217,883, filed Mar. 25, 1994. The present invention also may replace Bragg cells, since the present invention offers a wider band of interest.

The present apparatus for generating light employing a feedback loop may comprise a monitor in addition to the lamp and feedback loop. The monitor may comprise (i) a current detector (e.g., 4 in FIG. 1), (ii) a voltage detector (e.g., 3 in FIG. 1), or (iii) a current detector, a voltage detector and a multiplier (e.g., 5 in FIG. 1). The feedback loop may comprise a comparator (e.g., 7 in FIG. 1) and a reference voltage source (e.g., 6 in FIG. 1) in electrical communication with the comparator.

The present invention may also pertain to a method of stabilizing light output from a lamp which does not generate light below a threshold electric power but which, in response to an applied electric power greater than the threshold electric power, generates light of an intensity related to the difference between the applied electric power and the threshold electric power, comprising the steps of:

(A) electrically monitoring the power applied to said lamp, and (B) adjusting the power applied to the lamp such that the lamp generates light having a predetermined intensity.

This method may further comprise, simultaneously with the electrically monitoring step, the step of optically monitoring the power applied to the lamp (e.g., with photodiode 9 in FIG. 1). This method may be conducted using the present apparatus having an external power source and/or a feedback loop.

Obviously, numerous modifications and variations of the present invention are possible in light of the above teachings. It is therefore to be understood that within the scope of the appended claims, the invention may be practiced otherwise than as specifically described herein.

What is claimed is:

1. A method of transmitting light, comprising the steps of:
(A) generating with a first apparatus including (A) a first lamp containing one or more materials (i) which are at least partially solid or liquid under conditions of first lamp use or storage and (ii) which do not generate light below a threshold electric power but which, in response to an applied electric power greater than said threshold electric power, generate light of an intensity related to the difference between said applied electric power and said threshold electric power, and (B) an external power source for applying power to said first lamp sufficient to maintain said material which is at least partially solid or liquid under conditions of first lamp use or storage in the vapor state when said applied electric power is below said threshold electric power, light having a first wavelength ($\lambda_1$), a first intensity ($I_1$) or both a first wavelength ($\lambda_1$) and a first intensity ($I_1$), and (B) generating light having a second wavelength ($\lambda_2$), a second intensity ($I_2$) or both a second wavelength ($\lambda_2$) and a second intensity ($I_2$) within a period of time of from 1 nanosecond (1 ns) to 1 second (1 s) of said generating step (A), with a second apparatus including (A) a second lamp containing one or more materials (i) which are at least partially solid or liquid under conditions of second lamp use or storage and (ii) which do not generate light below a threshold electric power but which, in response to an applied electric power greater than said threshold electric power, generate light of an intensity related to the difference between said applied electric power and said threshold electric power, and (B) an external power source for applying power to said second lamp sufficient to maintain said material which is at least partially solid or liquid under conditions of second lamp use or storage in the vapor state when said applied electric power is below said threshold electric power, wherein at least one of the following relationships is true:

$\lambda_2 \neq \lambda_1$ $\lambda_2 \neq I_1$.

2. The method of claim 1, wherein said second wavelength is in the ultraviolet or visible spectrum, and said second intensity is at least 10 Watts.

3. A method of optical data transmission, comprising the steps of:

(a) transmitting light having a first wavelength, a first intensity or both a first wavelength and a first intensity from a first lamp including (A) a first lamp containing one or more materials (i) which are at least partially solid or liquid under conditions of first lamp use or storage and (ii) which do not generate light below a threshold electric power but which, in response to an applied electric power greater than said threshold electric power, generate light of an intensity related to the difference between said applied electric power and said threshold electric power, and (B) an external power source for applying power to said first lamp sufficient to maintain said material which is at least partially solid or liquid under conditions of first lamp use or storage in the vapor state when said applied electric power is below said threshold electric power, along an optical fiber to a receiver in optical communication with said optical fiber; and (b) within a period of time of from 0.1 nanosecond to 1 second of said transmitting step (A), transmitting light having a second wavelength, a second intensity or both a second wavelength and a second intensity from a second lamp including (A) a second lamp containing one or more materials (i) which are at least partially solid or liquid under conditions of second lamp use or storage and (ii) which do not generate light below a threshold electric power but which, in response to an applied electric power greater than said threshold electric power, generate light of an intensity related to the difference between said applied electric power and said threshold electric power, and (B) an external power source for applying power to said second lamp sufficient to maintain said material which is at least partially solid or liquid under conditions of second lamp use or storage in the vapor state when said applied electric power is below said threshold electric power, along said fiber to said receiver.

4. The method of claim 3, repeated a plurality of times at a rate of from 10 Gigahertz (10 GHz) to 1 hertz (1 Hz).

5. The method of claim 3, wherein said second wavelength is in the ultraviolet, visible or infrared spectrum, and said second intensity is at least 10 Watts.

6. The method of claim 3, wherein said second wavelength is in the ultraviolet or visible spectrum, and said second intensity is at least 10 Watts.

* * * * *